UNITED STATES PATENT OFFICE.

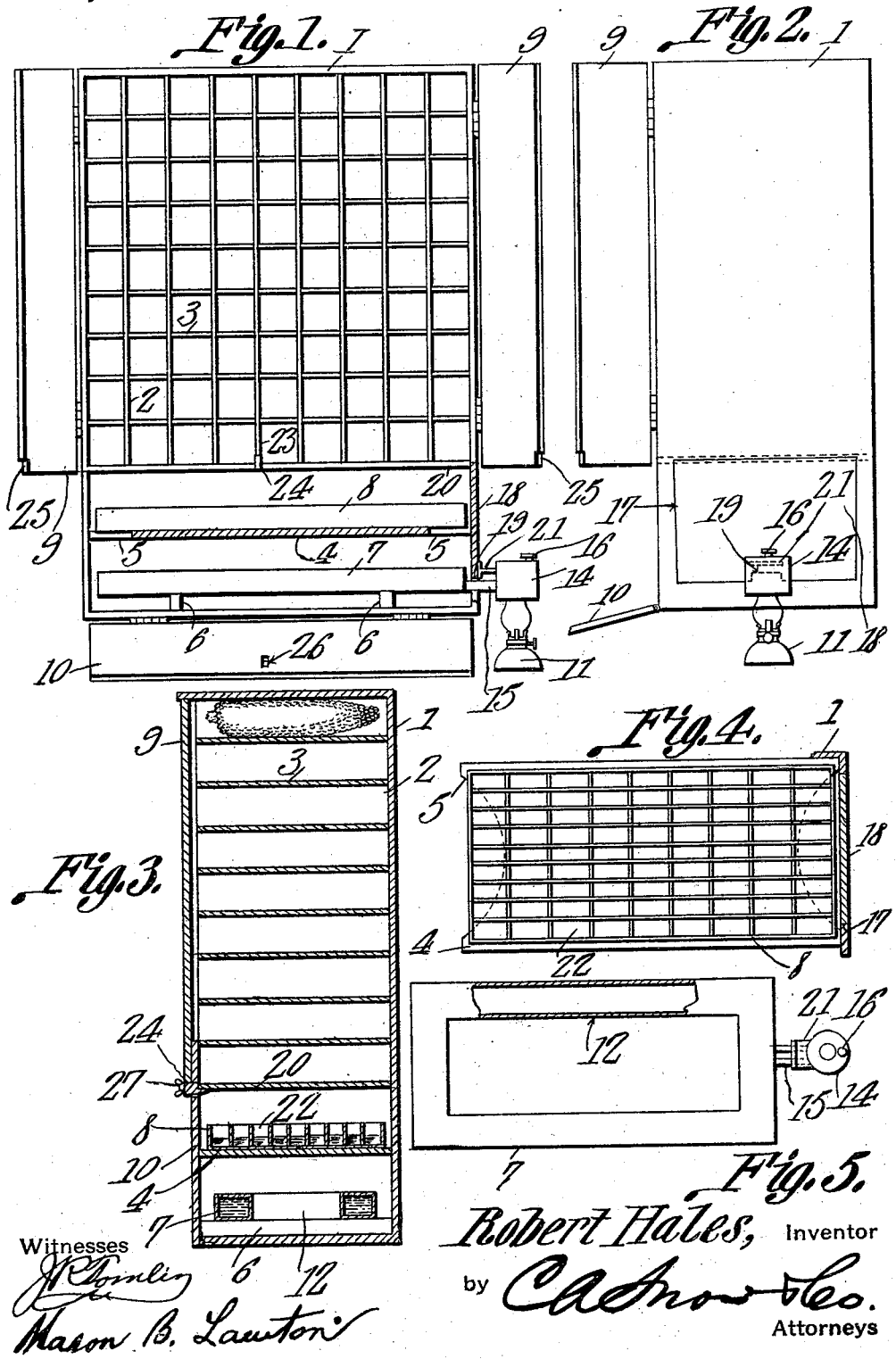

ROBERT HALES, OF GARFIELD TOWNSHIP, SIOUX COUNTY, IOWA.

SEED-CORN TESTER.

966,742.  Specification of Letters Patent.  Patented Aug. 9, 1910.

Application filed May 13, 1910.  Serial No. 561,157.

*To all whom it may concern:*

Be it known that I, ROBERT HALES, a citizen of the United States, residing in Garfield township, in the county of Sioux and State of Iowa, have invented a new and useful Seed-Corn Tester, of which the following is a specification.

The device forming the subject matter of this application is adapted to be used for testing selected ears of seed corn, in order to determine their germinating qualities.

One object of the invention is to provide a device of this sort adapted to house both the ears and kernels which have been removed from the ears for testing, means being provided for promoting the sprouting of the selected kernels.

Another object of the invention is so to fashion the constituent elements of the device that they may coöperate to retain the heat and mixture within its proper limits.

Another object of the invention is so to construct the device that a proper circulation may be secured.

Another object of the invention is to provide a novel means for heating the tank, and for insuring a proper circulation of water therein.

The drawings show typical embodiments merely, and it is to be understood that changes, properly falling within the scope of what is claimed, may be made, without departing from the spirit of the invention.

In the accompanying drawings,—Figure 1 shows the device in front elevation, the doors being swung open, and the parts being shown in section; Fig. 2 is an end elevation; Fig. 3 is a vertical transverse section; Fig. 4 is a top plan of the shelf and of the case which rests thereon, a portion of the cabinet-proper being shown in section; and Fig. 5 is a top plan of the tank.

In carrying out the invention there is provided, as a primary and fundamental element, a cabinet 1. The upper portion of this cabinet is filled with a series of pigeon-holes, formed by vertically extended members 2, and horizontally extended members 3, in the usual manner. Supported below the pigeon-holes is a shelf 4, upon which rests a case 8. Transverse sills 6 rest upon the bottom of the cabinet, and these sills 6 support a heater 7, the temperature of which is regulated by a lamp 11, located upon the outside of the cabinet 1. In order to secure proper circulation of the heated air which rises from the heater 7, the ends of the shelf 4 are cut away as denoted by the numeral 5, that the air may find its way about the ends of the case 8 which rests upon the shelf. The pigeon-holes may be closed by means of horizontally swinging doors 9, although the provision of these doors is not absolutely necessary. The lower portion of the cabinet, containing the heater 7 and the case 8, is closed by means of a vertically swinging door 10.

In a more detailed description, and referring particularly to Figs. 3 and 5 of the drawings, it will be seen that the heater includes a tank the ends of which are united to form a centrally open, continuous body 12, seen to best advantage in Fig. 5. A reservoir 14 is provided, the same being centrally open to receive the lamp 11. This reservoir 14 carries a suitable closure 16 whereby the reservoir may be filled, and there are spaced connections 15, preferably pipes or the like, uniting the reservoir 14 with the body 12 of the tank.

In one end of the cabinet 1 there is, as seen in Fig. 2, an opening 17, into which a closure plate 18 is adapted to fit, the closure plate being notched in its lower edge, as denoted by the numeral 19 in Fig. 1, and as shown in dotted lines in Fig. 2, this notch 19 in the lower edge of the closure plate 18 serving to receive the connections 15 whereby the reservoir 14 is united with the body 12 of the tank, the reservoir 14 being normally positioned without the cabinet. The tank is adapted to be inserted in the cabinet 1 through the opening 17, and the sills 6 serve to uphold the tank in such a position that it may readily be withdrawn from the cabinet when necessary. In order to retain the closure plate 18 in place, the upper end thereof is adapted to abut against one end of one of the horizontally disposed pigeon-hole forming members 20, the said pigeon hole forming member obviously constituting a fixed stop to receive the closure plate. If desired, the tank 14 may be provided with an outstanding foot 21, adapted to bear against the closure plate 18 and, when the closure plate is in place, this foot 21, bearing against the closure plate, serves to hold the same in abutment with the end of the pigeon-hole forming member 20.

As shown most clearly in Fig. 4, the case 8 is provided with a plurality of compartments 22. These compartments 22 are equal in number to the number of pigeon-holes in the upper part of the cabinet. Each pigeon-hole preferably carries a distinct number, and one of the compartments 22 in the case 8 carries a corresponding number.

When the doors 9 are employed, any common means may be provided for holding them in closed position. If desired, one of the vertical pigeon-hole forming members, denoted specifically by the number 23, may be provided with an outstanding extension 24, adapted to extend through notches 25 in the meeting edges of the doors 9, there being in the door 10, an opening 26, adapted to receive this projection. A securing device of some sort, if desired a button 27, may be mounted upon the end of the extension 24, and by rotating this button, the door 10 and both of the doors 9 may be held in their closed positions.

The operation of the device is as follows. The ears of corn which are to be tested, are stored away in the pigeon-holes in the top of the cabinet. A few kernels from each ear are then placed in the compartments 22 of the case 8, the ear of corn in a numbered pigeon-hole, having its removed kernels disposed in a correspondingly numbered compartment in the case 8. The compartments are filled with earth, saw-dust, or other material which will hold moisture. The reservoir 14 is then partially filled, and the lamp 11 lighted, whereupon the contents of the reservoir 14 and of the body 12 of the tank will be heated, the hot air rising from the tank, and passing through the openings 5 in the shelf 4. The kernels of corn in the compartments 22 of the case will ultimately sprout under the action of the warm air, and by comparing the number of the compartments 22 with the numbers upon the pigeon-holes, the germinating properties of each ear of corn may be accurately determined.

It will be seen that by seizing the reservoir 14, the reservoir and the tank body 12 may be slid outwardly, withdrawing the foot 21 from the closure plate 18, whereupon the closure plate may readily be lifted out of its place within the opening 17, thus permitting the heater 7, as an entity, to be withdrawn entirely from the cabinet in which it is mounted.

Having thus described the invention, what is claimed is:—

1. A device of the class described comprising a cabinet provided with an opening; a case supported within the cabinet; a heater adapted to be inserted through the opening beneath the case; a removable closure plate adapted to fit in the opening; and means upon the heater for retaining the closure plate within the opening.

2. A device of the class described comprising a cabinet having an opening at one end; a stop located within the cabinet; a case supported in the cabinet; a heater insertible through the opening beneath the case; a removable closure plate for the opening, adapted to abut against the stop; and means upon the heater for maintaining the closure plate in abutment with the stop.

3. A device of the class described comprising a cabinet provided with an opening; a stop located within the cabinet; a case supported in the cabinet; a reservoir located without the cabinet; a tank connected with the reservoir and adapted to be inserted into the cabinet through the opening and to be positioned beneath the case; a removable closure plate adapted to fit in the opening and to abut against the stop; and an outstanding foot upon the reservoir, adapted to bear against the closure plate to maintain the same in abutment with the stop.

4. A cabinet provided with an opening at one end; a tank supported within the cabinet and insertible through the opening; a shelf secured in the cabinet above the tank and having its ends cut away to provide for the passage of heated air from the tank around the ends of the shelf; means for heating the tank; and a closure plate fitting in the opening.

5. A device of the class described comprising a cabinet provided at its front with a hinged door, and having an opening at one end; a tank having its ends united to form a centrally open structure adapted to be inserted into the opening; a reservoir; spaced connections between the reservoir and the tank whereby the reservoir may be positioned without the cabinet; sills within the cabinet to uphold the tank within the contour of the opening; a closure plate for insertion into the opening, the plate being notched to receive the connections; a shelf supported within the cabinet above the tank; and a multi-compartment case to rest upon the shelf.

In testimony that I claim the foregoing as my own, I have hereto affixed my signature in the presence of two witnesses.

ROBERT HALES.

Witnesses:
F. B. CASSILL,
K. E. JACOBSON.